April 18, 1967     T. F. ZLOTEK     3,314,510

DUAL DRIVE CONTROL CLUTCH

Filed Feb. 10, 1965     2 Sheets-Sheet 1

INVENTOR
THADDEUS F. ZLOTEK

BY *Whitemore, Hulbert &*
*Belknap*

ATTORNEYS

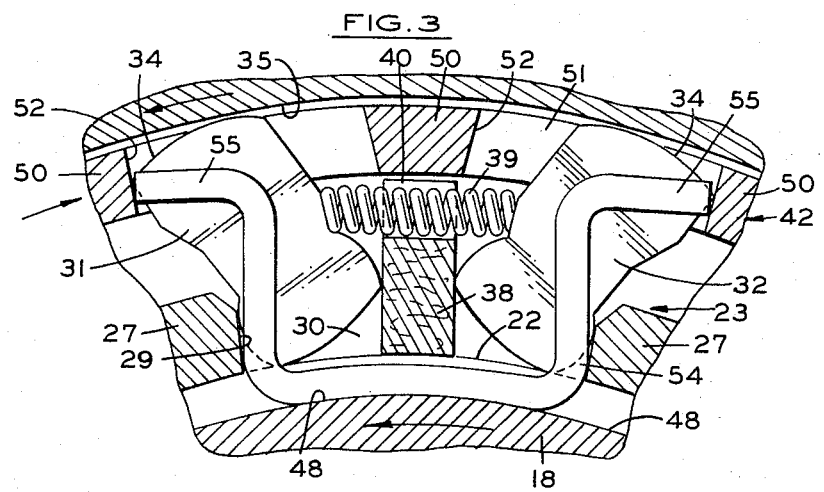
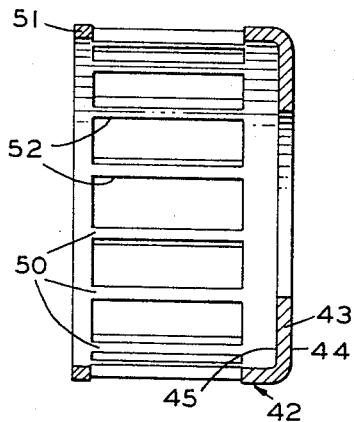
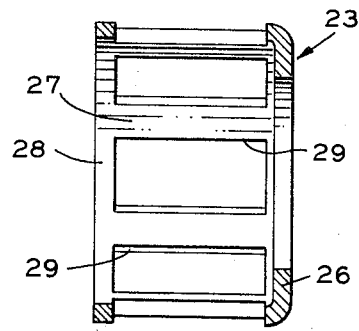

United States Patent Office 3,314,510
Patented Apr. 18, 1967

3,314,510
DUAL DRIVE CONTROL CLUTCH
Thaddeus F. Zlotek, Center Line, Mich., assignor to Formsprag Company, Warren, Mich., a corporation of Michigan
Filed Feb. 10, 1965, Ser. No. 431,567
5 Claims. (Cl. 192—45.1)

The present invention relates to improvements in a dual drive control clutch of the same general type, and for the same general purpose, as that illustrated and described in the patent to Warn et al. No. 3,055,471, of September 25, 1962. More particularly, the present clutch is a bi-directional one adapted to transmit driving torque in either rotative direction, and in this respect the clutch of the invention is a sprag type presenting features somewhat resembling those illustrated and described in the patent to Lund 3,102,618, dated September 3, 1963 and entitled Two Directional Torque Coupling and Clutch Mechanism. However, the mechanism of that patent deals with the function of permitting rotative drive of a driven member by a driver member in either rotative direction, while presenting reverse feedback of torque from the driven to the driver member in either direction; whereas it is the function of the present clutch to permit bi-directional rotative drive of a driven member, with overrun of the latter in a non-driving phase.

Thus a typical environment in which the improved clutch may find application is an installation in the front wheel hub unit of an automobile vehicle capable of being operated through a conventional transmission for either a two-wheel or a four-wheel drive of the vehicle. When the transmission is set for a two-wheel drive, as from the rear axle assembly along, it is desirable to relieve the front axle assembly from imposing a non-functional load on the transmission and prime mover, represented by frictional resistance of moving but non-driving parts. In general, this is the function of the clutch structure of the Warn et al. patent, and those skilled in the art will recognize various other applications of the idea for a control clutch function when only part of the plural driving instrumentalities are in action.

It is an object of the present invention to provide a sprag clutch of the type in question, which is simple, compact and inexpensive of construction, requiring only simple and cheaply assembled components capable of being mass-produced by conventional stamping and machining operations.

More specifically, it is an object of the invention to provide such a clutch, preferably bi-directional in action, which comprises coaxially telescoped and radially spaced driving and driven members, in the space between which a number of sets of wedging sprags are disposed, with half of the sprags of the respective sets oriented circumference-wise in one direction, and the remaining half circumferentially oriented in the opposite direction, as in the Lund patent identified above. These sprags are in effect socketed in a race element of one of the driver and driven members, shown as the driver, but in a more inexpensively manufactured design than that of the Lund patent; while the opposite ends of the sprags are adapted for releasable wedging and driving engagement with a cylindrical race part of the driven member.

Provision is made so that, with the vehicle transmission in gear for four-wheel drive at all axles, correspondingly oriented sprags of sets of pairs at the front wheel clutch assemblies will be tilted from a non-wedging position, in which they are spaced radially a trifle from the driven member race, into wedging engagement therewith to drive the front wheel hubs. With the transmission in two-wheel drive gear and de-clutched from the front axle, the wheel and hub freely overrun the sprag set, thus relieving the transmission and engine of a load which would otherwise be imposed by driving moving parts at the front assembly.

In accordance with the bi-directional clutch embodiment of the present improvement, the provisions in question comprise an annular driver or drive coupling member having integral stamped cross pieces defining openings in which a number of sets of sprags are received adjacent the driving clutch race, and coil springs to normally bias the sprags of each oppositely oriented pair or set out of wedging engagement with the other or driven clutch race. Further individual springs act in the openings of the drive coupling member to restore the latter to a neutral position when the drive torque is discontinued following four-wheel drive; and they remain in this neutral position when the front wheel drive is not in effect in two-wheel operation.

In further accordance with the improvement, the drive coupling member referred to has an integral annular and radially extending part presenting an annular friction surface which faces axially outwardly; and a frictional drag ring is engageable between the last named surface and an axially facing friction surface of a coacting fixed or grounded member, with further spring means biasing the drive coupling member into frictional engagement with the drag ring, this spring acting on the inner surface of the radially extending part of the coupling member.

As indicated above, these arangements are very simple, compact and highly effective and reliable in operation.

The foregoing as well as other objects will become more apparent as this description proceeds, especially when considered in connection with the accompanying drawings illustrating the invention, wherein:

FIG. 3 is a fragmentary view in enlarged scale and vertical transverse section along line 3—3 of FIG. 2, more clearly illustrating the arrangement of certain sprag, race, retainer, coupling and spring components of the clutch; and FIGS. 4 and 5 are, respectively, views in axial section through stamped retainer and drive coupling elements of the clutch.

Figure 2:
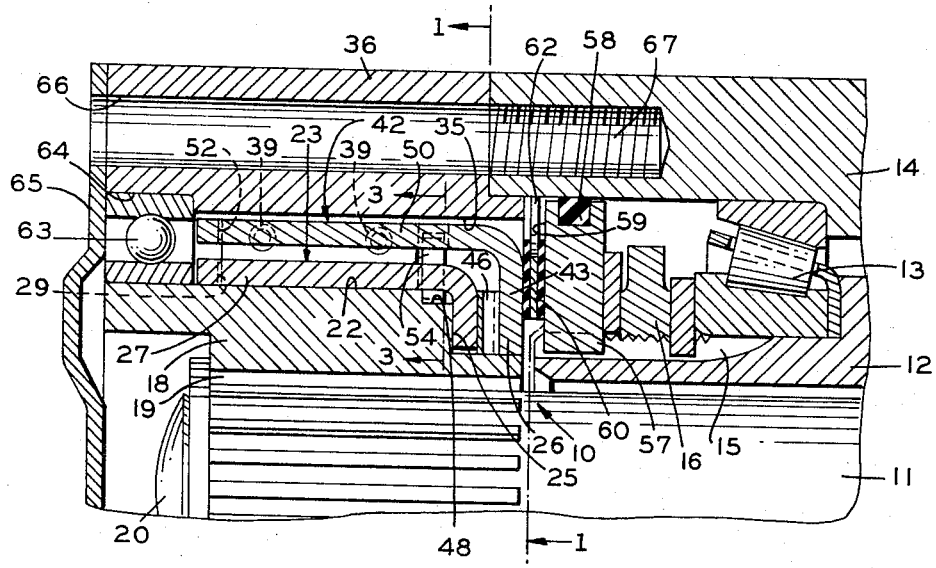
FIG. 2 is a fragmentary view in longitudinal section along line 2—2 of FIG. 1.
Figure 1:
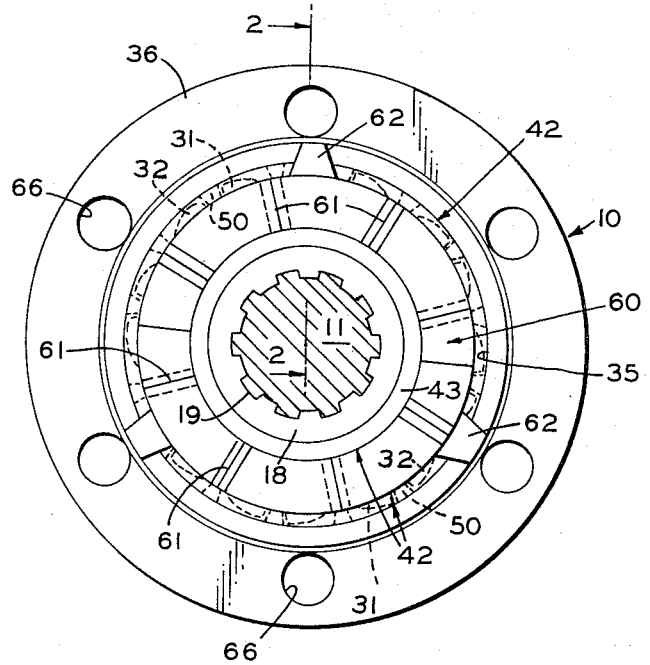
FIG. 1 is a view in transverse vertical section along broken line 1—1 of FIG. 2, in effect representing an end elevation of components of the improved dual drive control clutch on one axial side of its fixed ground member.

The improved bi-directional and dual control clutch of the invention is generally designated by the reference numeral 10 and a contemplated setting thereof, as indicated above, is in a selectively two-wheel or four-wheel driven vehicle, being located directly at the ends of the axle housing and hub assembly of the front wheel of such vehicle. Thus, the axle proper 11 of the front wheel assembly extends with radial clearance through a fixed tubular axle housing 12, with a tapered roller bearing 13 mounting a wheel hub 14 for rotation; and the improved clutch 10 is adapted to be bolted to the outer end of this hub. Housing 12 has a keyway 15 upon which a bearing retainer nut 16 is threaded. Each end of axle 11 has such a bearing assembly associated with one of the clutch units of the invention.

The clutch 10 comprises an annular driver race 18 which is internally splined at 19 to receive and be driven by the outer end of drive axle 11, appropriate end cap means 20 being threaded on the axle end to hold driver 18 in place. The latter presents a cylindrical inner driving race surface at 22; and a stamped sheet metal sprag retainer 23 is force-fitted over surface 22, axially telescoping the latter for a substantial distance, as shown in FIG. 2.

The driver race member 18 is formed to provide an axially facing abutment shoulder 25, and retainer 23, as best shown in FIGS. 2 and 4, is stamped to provide a radially inwardly extending, continuous annular flange 26 surrounding an opening at one axial end thereof. In some adaptations the flange 26 may be omitted. The retainer also has an annular series of integral, axially extending cross bars or pieces 27 connecting with an opposite integral ring element 28 of the retainer. The cross members 27 thus define a circumferentially spaced series of openings 29 about retainer 23 so that, as force-fitted on race surface 22 of driving race 18, the openings 29 have the effect of defining a series of sockets 30, as best illustrated in FIG. 3, in which sockets the inner wedging ends of pairs or sets of conventionally shaped sprags 31 and 32 are received, being restrained circumferentially at these sprag ends by successive cross bars 27 of the retainer 23.

Although the number may of course vary, there are five such sets of sprags in the illustrated embodiment and, in the manner shown in the Lund patent identified above, the sprags 31, 32 of the respective sets are oriented oppositely in the circumferential sense. Thus, a tilting of the sprag 31 in the clockwise direction (FIG. 3), will bring its outer cam or wedging surface 34 into wedging engagement with the cylindrical race surface 35 of an annular, outer driven member 36 of the clutch 10; while a counterclockwise movement of the other sprag 32 of the pair will bring its corresponding wedging surface 34 into wedging and driving engagement with driven race surface 35. An appropriate non-metallic spacer 38 extends axially along the inner race surface 22 between the sprags 31, 32 of each set, separating the same in a positive fashion from one another; and a pair of small coiled compression springs 39 (FIG. 3) act oppositely through outer openings or recesses 40 in each such spacer to urge sprags 31, 32 oppositely, i.e., in a direction out of biasing engagement with the driven race surface 35. The sprags remain in this position in two-wheel drive operation of clutch 10.

The reference numeral 42 designates an annular stamped sheet metal drive coupling member, best illustrated in FIG. 5, which should be considered in conjunction with FIGS. 2 and 3. This member is provided with a continuous integral, radially inwardly extending annular flange 43 affording an axially facing outer frictional surface 44 and an inner radial surface 45. Coupling member 42 telescopes onto a reduced diameter end portion of driver race member 18, in axially outwardly spaced relation to the facing flange 26 of retainer member 23; and an annular undulatory or wave spring 46 or equivalent spring means, acts between the last named flange and the facing surface 45 of coupler flange 43, for a purpose to be described. Directly inwardly in the axial direction from the abutment shoulder 25 of race member 18, the latter is externally machined to provide a radially outwardly extending cylindrical surface 48 of small radial depth, also for a purpose to be described.

Referring again to FIG. 5, the drive coupling 42 has a plurality of equally spaced integral cross bars or pieces 50 extending axially from its radial flange 43 to an integral connection with an opposite end ring 51 of the member. These cross pieces 50 define a plurality of equally spaced openings 52, ten in number, in which the outer wedging ends of the five sets of sprags 31, 32 are received, as best shown in FIG. 3; and it will be noted that the sprags each outwardly abut, in the circumferential direction, one of the cross pieces 50, for operation by coupling member 42 in a manner later described.

As shown in FIG. 3 (see also FIG. 2), a series of small restoring springs 54 of generally U-shaped outline and slight axial dimension are seated upon the radially facing cylindrical surface 48 on the exterior of driver race member 18, to one axial side of each set of sprags 31, 32. The arms of these springs 54 extend radially outwardly and have 90° fingers 55 bent circumferentially outwardly of each thereof. Fingers 55 are received in the coupling member openings 52 for engagement by adjacent cross members 50 of the coupler. They come into play at the termination of each four-wheel drive phase to shift the coupling member 42 a slight amount oppositely of the drive direction, thereby enabling the coil springs 39 to restore the sprags 31, 32 to the non-wedging position shown in FIG. 3; and they also maintain the coupling member in a neutral position during two-wheel drive operation, permitting springs 39 to decouple the sprags from driven race surface 35.

Finally, the clutch 10 comprises a dual function, sealing and frictional retarder ring 57, shown only in FIG. 2, which is provided with an annular external groove receiving a sealing O-ring 58 in sealing engagement with the inner surface of hub 14, thus to separate a conventionally grease-packed space receiving bearing 13 and retainer nut 16 from the oil-lubricated space in which the various race, sprag and coupling components are housed. Ring 57 presents a continuous annular frictional surface 59 facing the friction surface 44 of drive coupling member 42; and an annular friction disc 60 is interposed between these surfaces. Typically, disc 60 is oppositely corrugated at 61 and is clad on its opposite axial sides with a suitable metallic or non-metallic friction material providing a desirable frictional coefficient against surfaces 44 and 59. Friction disc 60 is centered in the recess sealed by O-ring 58 by means of a plurality of equally spaced, radially projecting ears 62 on the disc.

At the opposite end of the clutch assembly 10, a ball bearing 63 is sleeved over the inner race surface 22, being received in a counterbore 64 of driven race member 36. A cover plate 65 is applied to this end of clutch unit 10, this plate and the driven member having a series of equally spaced, axially extending bolt holes 66 by which the race member 36 is adapted to be connected to the wheel hub 14. The latter is drilled and tapped at 67 to receive the connecting bolts (not shown).

In operation, with the vehicle transmission geared for four-wheel drive, the initial rotation of axle 11 to rotate the inner driver race member 18, for example, in the counterclockwise direction indicated by arrow in FIG. 3, will cause a slight relative shift of the drive coupler stamping 42 in the opposite, clockwise relative rotative direction, due to the drag exerted on flange 43 of member 42 by the friction ring 60 interposed between that surface and the surface 59 of friction disc 57. This suffices to tilt the left-hand sprag 31 clockwise to bring its wedging surface 34 into operative wedging engagement with the driven race surface 35, while the other sprag 32 of the set remains clear of that surface. Accordingly, the race member 36 is driven positively; and when drive torque ceases, the U-shaped restoring springs 54 come into play to shift coupling member 42 oppositely a bit, permitting coil springs 39 to free the sprags 31 from wedging race engagement when drive torque no longer is required.

On the other hand, when the operator of the vehicle places its transmission in condition for two-wheel drive, as by de-clutching the power line from the transmission to the front wheel axle 11, or otherwise disabling the torque connection, the wheel hub 14 overruns or free wheels relative to this idle or dead axle, since the sprags 31, 32 are urged out of engagement with the race 35, as shown in FIG. 3. Free wheeling takes place in either rotative direction with negligible friction as hub 14 is journaled at bearing 13 and piloted outboard at the race bearing 63.

However, when the drive connection is re-clutched or restored for four-wheel drive, in one direction or the other, the initial rotation of front axle 11 results in a friction drag at the coupling member 42 and friction disc 60 between the coupler and the ring 57 grounded to fixed axle housing 12. This drag is sufficient to cause one of the fingers 50 to shift one of the sprags 31 or 32 sufficiently to bring its surface 34 into wedging engagement with race 35, whereupon drive of the hub 14 ensues.

The clutch 10 is simple, compact and inexpensively fabricated as to its parts and assembled. It frees the vehicle engine and transmission of a considerable frictional resistive torque load during two-wheel drive, but instantaneously restores the system for four-wheel drive when that is required. Obviously, corresponding advantages may be had in a number of other types of installation.

What I claim as my invention is:

1. A clutch of the type described, comprising rotatable driver and driven members in coaxially telescoped, radially spaced relation to one another and providing mutually facing cylindrical race surfaces, a series of sprags disposed in the annular space between said surfaces for releasable wedging and non-wedging engagements, respectively, therebetween in driving and non-driving phases of operation of the clutch, an annular drive coupling member having circumferentially spaced cross pieces defining end limits of openings receiving ends of said sprags adjacent one of said races, and means resiliently biasing the sprags in a direction to interrupt wedging engagement of the sprags with said last named race, said cross pieces of said drive coupling member being engageable with the sprags to urge the same into wedging engagement, said coupling member having an annular, generally radially extending friction surface, means providing a non-rotative annular and generally radially extending friction surface axially adjacent said coupling member friction surface, said friction surfaces being in frictional engagement with one another, thus to urge said coupling member cross pieces against said sprags, and to wedge the sprags against said last named race in a driving phase.

2. A clutch of the type described, comprising rotatable driver and driven members in coaxially telescoped, radially spaced relation to one another and providing mutually facing cylindrical race surfaces, a series of sprags disposed in the annular space between said surfaces for releasable wedging and non-wedging engagements, respectively, therebetween in driving and non-driving phases of operation of the clutch, an annular drive coupling member having circumferentially space cross pieces defining end limits of openings receiving ends of said sprags adjacent one of said races, means resiliently biasing the sprags in a direction to interrupt wedging engagement of the sprags with said last named race, said cross pieces of said drive coupling member being engageable with the sprags to urge the same into said wedging engagement, said coupling member having an annular, generally radially extending friction surface, means providing a non-rotative annular and generally radially extending friction surface axially adjacent said coupling member friction surface, and spring means axially biasing said friction surfaces in frictional engagement with one another, thus to urge said coupling member cross pieces against said sprags, and to wedge the sprags against said last named race in a driving phase.

3. A clutch of the type described, comprising rotatable driver and driven members in coaxially telescoped, radially spaced relation to one another and providing mutually facing cylindrical race surfaces, a series of sprags disposed in the annular space between said surfaces for releasable wedging and non-wedging engagements, respectively, therebetween in driving and non-driving phases of operation of the clutch, one of said race surfaces having retainer means fixedly secured thereon and circumferentially limiting movement of ends of the sprags engaging said surface in said phases, an annular drive coupling member having circumferentially spaced cross pieces defining end limits of openings receiving the opposite ends of said sprags adjacent the other of said races, means resiliently biasing the sprags in a direction to interrupt wedging engagement of the sprags with said last named race, said cross pieces of said drive coupling member being engageable with the sprags to urge the same into said wedging engagement, said coupling member having an integral annular, generally radially extending friction surface, means providing a non-rotative annular and generally radially extending friction surface axially adjacent said coupling member friction surface, spring means axially biasing said friction surfaces in frictional engagement with one another, thus to urge said coupling member cross pieces against said sprags, and to wedge the sprags against said last named race in a driving phase, and a series of springs acting circumferentially on the cross pieces of said coupling member to urge the latter in a direction to permit the sprags to move out of wedging engagement with the last named race.

4. A bi-directional clutch of the type described, comprising rotatable driver and driven members in coaxially telescoped, radially spaced relation to one another and providing mutually facing cylindrical race surfaces, a circumferential array of sets of sprags disposed in the annular space between said surfaces for releasable wedging and non-wedging engagements, respectively, therebetween in bi-directional driving and non-driving phases of operation of the clutch, half of the sprags of said sets being oriented in one circumferential sense to wedge and transmit torque between said driven and driver members in one direction of rotation of the latter, the other half being oppositely oriented circumferentially, an annular drive coupling member having circumferentially spaced cross pieces defining end limits of openings receiving ends of said sprags adjacent one of said races, and means resiliently biasing the sprags of the respective sets in directions to interrupt wedging engagement of the sprags with said last named race, said cross pieces of said drive coupling member being engaged with the sprags to urge the same into said wedging engagement, said coupling member having an annular, generally radially extending friction surface, means providing a non-rotative annular and generally radially extending friction surface axially adjacent said coupling member friction surface, said friction surfaces being in frictional engagement with one another, thus to urge said coupling member cross pieces against said sprags, and to wedge the sprags against said last named race in a driving phase.

5. A bi-directional clutch of the type described, comprising rotatable driver and driven members in coaxially telescoped, radially space relation to one another and providing mutually facing cylindrical race surfaces, a circumferential array of sets of sprags disposed in the annular space between said surfaces for releasable wedging and non-wedging engagements, respectively, therebetween in bi-directional driving and non-driving phases of operation of the clutch, half of the sprags of said sets being oriented in one circumferential sense to wedge and transmit torque between said driven and driver members in one direction of rotation of the latter, the other half being oppositely oriented circumferentially, one of said race surfaces having retainer means fixedly secured thereon and circumferentially limiting movement of ends of the sprags engaging the same in said phases, an annular drive coupling member having circumferentially spaced cross pieces defining end limits of openings receiving the opposite ends of said sprags adjacent the other of said races, means resiliently biasing the sprags of the respective sets in directions to interrupt wedging engagement of the sprags with said last named race, said cross pieces of said drive coupling member being engageable with the sprags to urge the same into said wedging engagement, said coupling member having an annular, generally radially extending friction surface, means providing a non-rotative annular and generally radially extending friction surface axially adjacent said coupling member friction surface, spring means axially biasing said friction surfaces in frictional engagement with one another, thus to urge said coupling member cross pieces against said sprags, and to wedge the sprags against said last named race in a driving phase, and a series of springs acting circumferentially on the cross pieces of said coupling member to urge the latter in a direction to permit the sprags to move out of wedging engagement with the last named race.

References Cited by the Examiner
UNITED STATES PATENTS

| | | | |
|---|---|---|---|
| 1,163,298 | 12/1915 | Winkler | 192—36 X |
| 2,910,159 | 10/1959 | Nielsen | 192—45.1 |
| 3,055,471 | 9/1962 | Warn et al. | 192—45 |
| 3,123,169 | 3/1964 | Young | 192—36 X |
| 3,164,234 | 1/1965 | Tamarin | 192—47 X |
| 3,194,369 | 7/1965 | Witte | 192—41.3 X |

DAVID J. WILLIAMOWSKY, *Primary Examiner.*
BENJAMIN W. WYCHE III, *Examiner.*